United States Patent
Rehman et al.

(10) Patent No.: US 11,876,688 B1
(45) Date of Patent: Jan. 16, 2024

(54) SYSTEMS AND METHODS FOR POLICY-BASED MONITORING OF NETWORK KEY PERFORMANCE INDICATORS

(71) Applicant: Verizon Patent and Licensing Inc., Basking Ridge, NJ (US)

(72) Inventors: Syed Rehman, Monmouth Junction, NJ (US); Raghuram Parvataneni, Plano, TX (US); Mahesh Chapalamadugu, Plano, TX (US); Urvika Vummadisetty, Hyderabad (IN)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/813,775

(22) Filed: Jul. 20, 2022

(51) Int. Cl.
*H04L 41/5009* (2022.01)
*H04L 41/0894* (2022.01)
*H04L 43/08* (2022.01)

(52) U.S. Cl.
CPC ...... *H04L 41/5009* (2013.01); *H04L 41/0894* (2022.05); *H04L 43/08* (2013.01)

(58) Field of Classification Search
CPC ... H04L 41/0894; H04L 43/091; H04L 43/08; H04L 41/5009
See application file for complete search history.

(56) References Cited

U.S. PATENT DOCUMENTS

| | | | |
|---|---|---|---|
| 2016/0103559 A1* | 4/2016 | Maheshwari | G06F 3/0481 715/738 |
| 2016/0173211 A1* | 6/2016 | Ouyang | H04B 17/318 455/425 |
| 2019/0044830 A1* | 2/2019 | Kersch | H04L 43/091 |
| 2019/0141542 A1* | 5/2019 | Ganapathi | H04L 41/14 |
| 2019/0261200 A1* | 8/2019 | Ganapathi | H04L 41/0894 |
| 2020/0107313 A1* | 4/2020 | Zhang | H04L 41/20 |
| 2020/0244527 A1* | 7/2020 | Sharma | H04L 41/0816 |
| 2021/0152439 A1* | 5/2021 | Soulhi | H04L 43/04 |
| 2021/0337555 A1* | 10/2021 | Fan | H04W 72/543 |
| 2023/0060623 A1* | 3/2023 | Wang | H04L 41/16 |

OTHER PUBLICATIONS

3rd Generation Partnership Project, "3GPP TS 23.501 V17.5.0, Technical Specification Group Services and System Aspects; System architecture for the 5G System (5GS); Stage 2 (Release 17)," Jun. 2022.

* cited by examiner

*Primary Examiner* — Joe Chacko

(57) ABSTRACT

A system described herein may monitor, on an ongoing basis, a Key Performance Indicators ("KPIs") associated with a wireless network. The system may receive, from a particular device, a monitoring policy specifying one or more criteria, and may compare the criteria associated with the monitoring policy to the monitored KPIs. The system may determine, based on the comparing, that the criteria associated with the monitoring policy is satisfied; may determine a particular subset of the monitored KPIs based on the monitoring policy and further based on determining that the criteria associated with the monitoring policy is satisfied; and may output the particular subset of the monitored KPIs to the second device. The system may monitor the wireless network via private interfaces that are not exposed to devices external to the wireless network.

20 Claims, 10 Drawing Sheets

SYSTEMS AND METHODS FOR POLICY-BASED MONITORING OF NETWORK KEY PERFORMANCE INDICATORS

BACKGROUND

Networks, such as wireless networks, may be used to provide network-based services to User Equipment ("UEs"), such as mobile telephones, laptops, tablets, etc. Network-based services may include voice and/or video calling services, gaming services, augmented reality ("AR") services, or other types of services. Different services may have different Quality of Service ("QoS") requirements and/or may have different parameters or mechanisms for preserving user experience under differing network conditions.

DETAILED DESCRIPTION OF EXAMPLE EMBODIMENTS

The following detailed description refers to the accompanying drawings. The same reference numbers in different drawings may identify the same or similar elements.

Embodiments described herein provide for policy-based monitoring of Key Performance Indicators ("KPIs") associated with a network, such as a wireless network (e.g., a Long-Term Evolution ("LTE") network, a Fifth Generation ("5G") network, etc.). For example, as discussed below, an application and/or service provider (referred to simply as "application provider" for the sake of brevity) may specify policies, rules, conditions, etc. for particular network KPIs, metrics, etc. A policy-based monitoring system, in accordance with some embodiments, may receive and/or monitor network KPIs associated with a wireless network (e.g., associated with one or more RANs of the wireless network, a core network of the wireless network, etc.), and may provide a subset of the monitored network KPIs to the application provider. For example, the policy-based monitoring system may receive and/or monitor KPIs or other information that are "internal to" and/or otherwise not exposed by the network, and may automatically output (e.g., "push") an alert to the application provider (and/or may perform some other suitable action) when rules, policies, conditions, etc. specified by the application provider are met.

In this manner, the application provider may receive detailed and/or granular information that is of particular relevance to the application provider (e.g., at least by virtue of meeting rules, policies, etc. specified by the application provider), without the network exposing additional and/or unnecessary information. The application provider may use the detailed and/or granular information to improve the applications and/or services provided by the application provider via the network. For example, in instances where the network is experiencing relatively heavy load or other types of issues, the application provider may reduce a bitrate of content or other traffic output by the application provider, in order to preserve low latency of such services. Further, in some embodiments, the amount and/or type of information provided to the application provider may be subject to permissions, authorization and/or authentication procedures, etc., thus allowing an operator of the network to maintain a level of privacy and control over which entities receive which network KPIs. As such, the considerations of the application provider and the network operator may be balanced in accordance with embodiments described herein, in addition to delivering an enhanced user experience to users that receive services from such application providers via the network.

Figure 1:
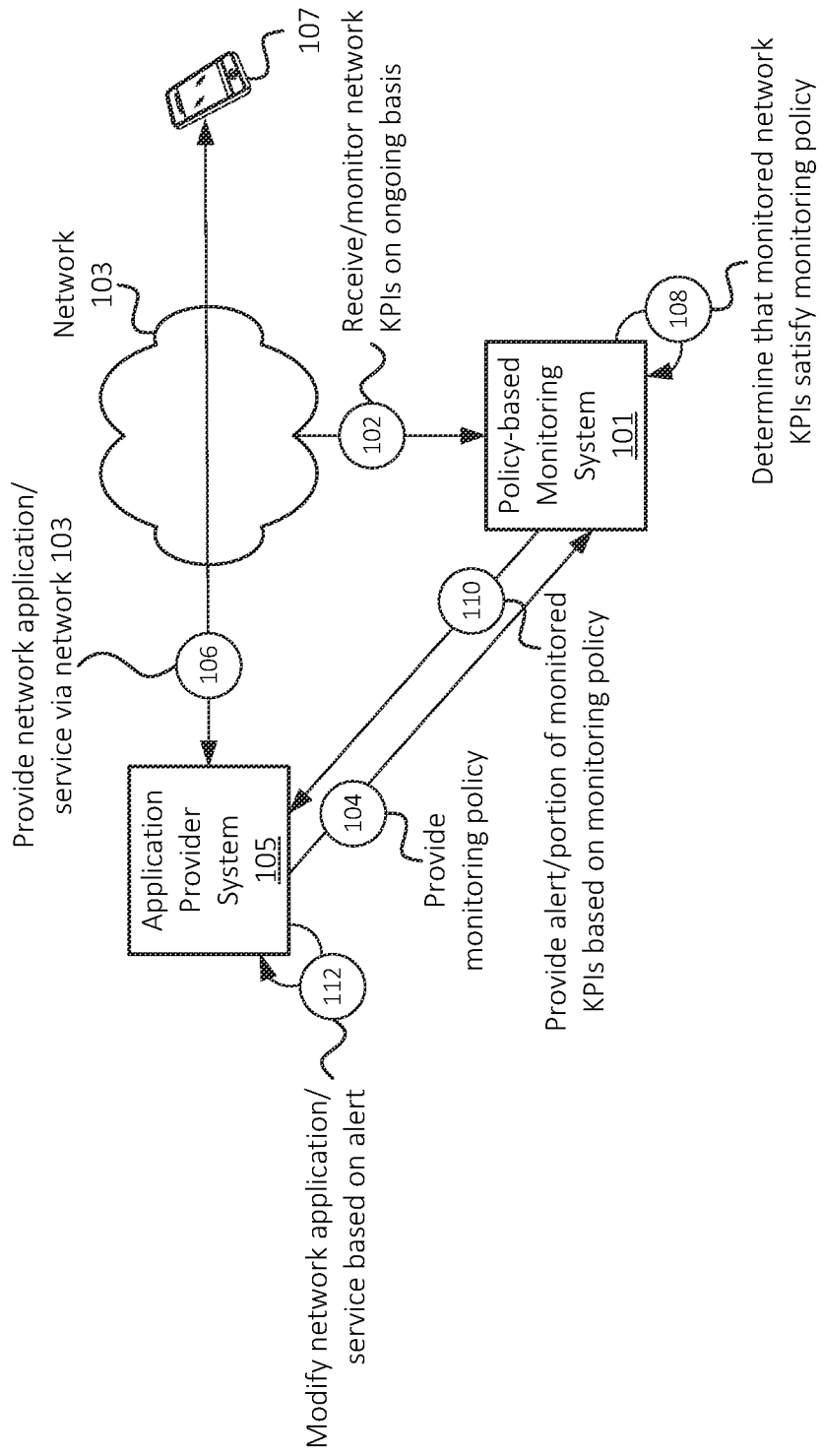
FIG. 1 illustrates an example overview of one or more embodiments described herein.

As shown in FIG. 1, for example, Policy-based Monitoring System ("PMS") 101 may monitor (at 102) network 103, which may include receiving KPIs, metrics, configuration parameters, and/or other information (referred to herein as "KPIs" for the sake of brevity) associated with network 103 on an ongoing basis. As discussed below, PMS 101 may communicate with various elements, network functions, interfaces, etc. associated with network 103 in order to monitor network 103 over time. PMS 101 may, in some embodiments, be an internal component of network 103, and/or may be communicatively coupled to one or more components, elements, etc. of network 103 via private and/or secure interfaces. In this manner, while PMS 101 may monitor (at 102) a vast amount of KPIs associated with network 103, such KPIs may not be available or exposed to unauthorized entities that are external to network 103.

Figure 2:
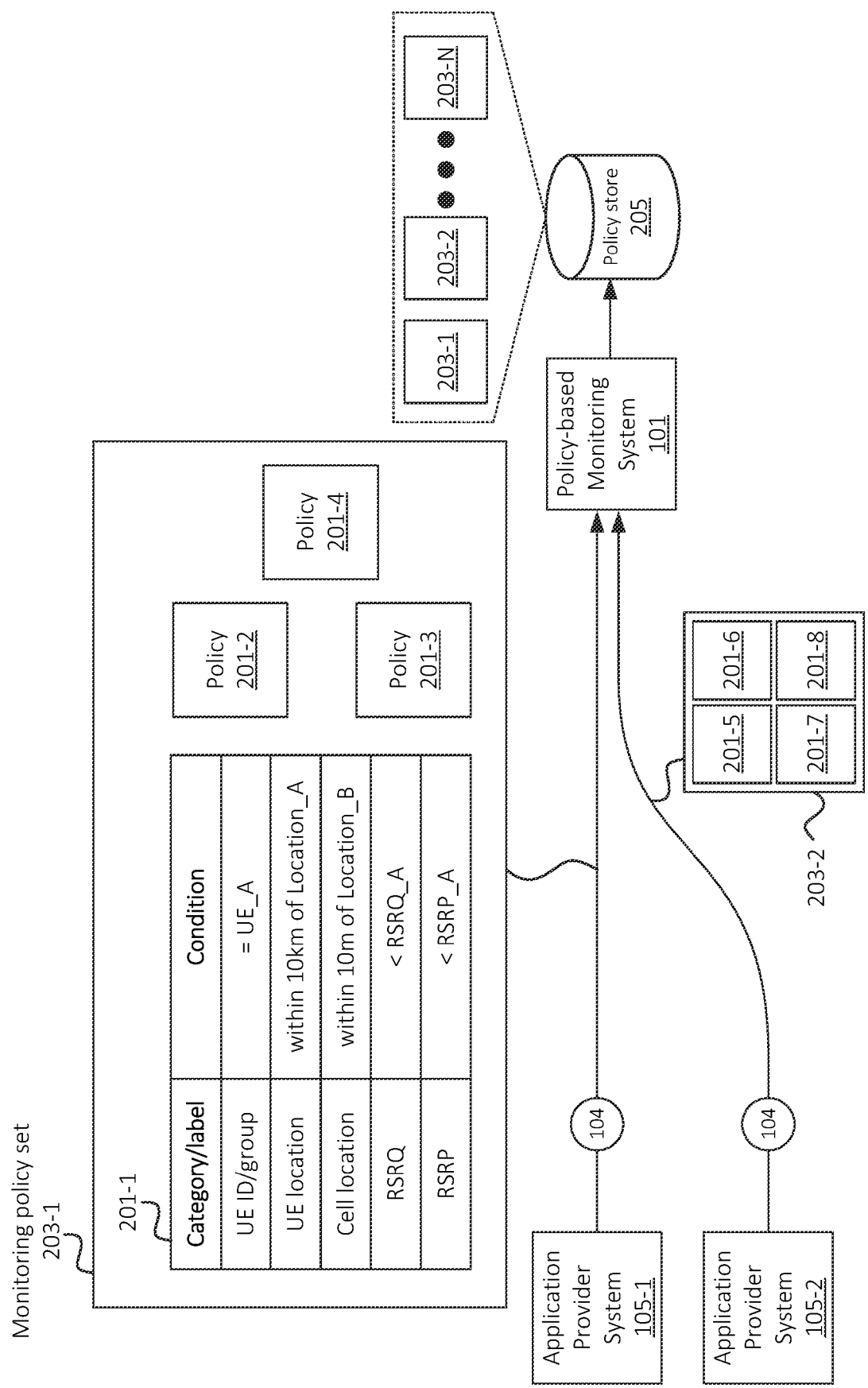
FIG. 2 illustrates an example of monitoring policy sets associated with different application provider systems, in accordance with some embodiments.

As further shown, PMS 101 may receive (at 104) one or more sets of monitoring policies from one or more application provider systems 105 and/or other suitable devices or systems. A monitoring policy, as discussed below, may specify one or more KPIs of network 103 requested by a particular application provider system 105 to monitor. The monitoring policy may further specify one or more conditions, triggers, etc. based on which the one or more KPIs should be monitored and/or reported to the particular application provider system 105. FIG. 2 illustrates an example of monitoring policies 201 that may be provided (at 104) by multiple application provider systems 105, such as example application provider systems 105-1 and 105-2. For instance, application provider systems 105-1 and 105-2 may each provide respective sets 203 of monitoring policies 201 (e.g., monitoring policy sets 203-1 and 203-2) to PMS 101. In this manner, each application provider system 105 may be associated with its own respective monitoring policy set 203.

As shown, example monitoring policy 201-1, included in monitoring policy set 203-1 associated with application provider system 105-1, may include conditions relating to a set of categories or labels, which may each be associated with one or more network KPIs, identifiers, configuration parameters, or other suitable information. In some embodiments, PMS 101 may implement or provide an application programming interface ("API") specifying particular categories, labels, KPIs, identifiers, etc. that may be specified by application provider systems 105 for monitoring policies 201. In this example, monitoring policy 201-1 may specify that monitoring policy 201-1 should be alerted of KPIs that relate to a particular UE 107 (e.g., may specify an identifier of the particular UE 107, such as an Internet Protocol ("IP") address, a Mobile Directory Number ("MDN"), and/or some other identifier, represented in the figure as "UE_A"). Monitoring policy 201-1 may further specify that the alert should be provided when a location of UE 107 is within 10 km of a particular location (e.g., may specify latitude and longitude coordinates, a city name, an address, etc., represented in the figure as "Location_A"); that a location of a cell to which UE 107 is connected is within 10 m of another location (e.g., represented as "Location_B"); when a measure of Reference Signal Received Quality ("RSRQ") associated with UE 107 is below an RSRQ threshold (e.g., below "RSRQ_A"); and when a measure of Reference Signal Received Power ("RSRP") associated with UE 107 is below an RSRP threshold (e.g., below "RSRP_A").

In practice, other types of KPIs, configuration parameters, identifiers, etc. may be specified by application provider systems 105 (e.g., may be provided or exposed by PMS 101 via one or more APIs). Further, although the conditions were described above in the context of "and" operators (e.g., based on which application provider system 105-1 may be alerted only if all of the conditions are true), in practice, "or" operators or other types of operators or conditions may be used in accordance with some embodiments. Other example KPIs, identifiers, configuration parameters, etc. may include application layer and/or user plane metrics, such as throughput, latency, jitter, packet loss, Quality of Service ("QoS") level, traffic source and/or destination (e.g., IP address and/or port), etc. associated with user plane traffic associated with a particular application provider system 105 or UE 107. As another example, such KPIs, configuration parameters, etc. may include RAN metrics, such as signal strength, signal quality, Signal-to-Interference-and-Noise-Ratio ("SINR"), uplink and/or downlink radio frequency ("RF") throughput, uplink and/or downlink RF retransmission rate, etc.

As further shown in FIG. 2, monitoring policy set 203-1 may include additional monitoring policies 201-2, 201-3, and 201-4. Additionally, monitoring policy set 203-2, associated with application provider system 105-2, may include monitoring policies 201-5 through 201-8. As such, application provider systems 105-1 and 105-2 may be associated with distinct monitoring policy sets 203-1 and 203-2, respectively. PMS 101 may store, maintain, etc. monitoring policy sets 203 (e.g., monitoring policy set 203-1, 203-2, and/or one or more other monitoring policy sets 203) in policy store 205, which may include one or more storage devices that are included in or are communicatively coupled to PMS 101.

In some embodiments, monitoring policy sets 203 may specify actions to take when conditions associated with particular monitoring policies 201 are met. For example, monitoring policy set 203-1 may indicate that when network KPIs meet conditions associated with monitoring policy 201-1, that application provider system 105-1 should be alerted, and that raw RSRP and/or RSRQ values (e.g., granular values that reflect values taken at, or averaged over, 0.5-second intervals) associated with the specified UE_A over a 15-second time span should be provided to application provider system 105-1. As another example, monitoring policy set 203-1 may indicate that when network KPIs meet conditions associated with monitoring policy 201-2, that application-level throughput associated with all traffic outputted by application provider system 105-1 over a one-day time window should be provided to application provider system 105-1 and/or to some other device or system. For example, application provider system 105 may specify a callback Uniform Resource Locator ("URL"), an IP address, etc. specifying some other device or system to which such information should be provided in the event that a given set of conditions is met. In some embodiments, monitoring policy sets 203 may specify one or more other actions, such as adjustments to one or more devices or systems of network 103 based on the satisfaction of one or more monitoring policies 201.

In some embodiments, PMS 101 may authenticate application provider systems 105-1 and 105-2 and/or determine whether application provider systems 105-1 and 105-2 are authorized to access or receive the requested information and/or specify one or more actions. For example, an operator of network 103 may provide authorization information associated with each respective application provider system 105, which may be based on a registration procedure performed between respective application provider systems 105 and network 103. Further, PMS 101 and/or some other device or system may perform one or more authentication procedures with application provider systems 105 in order to authenticate respective application provider systems 105. In this manner, application provider systems 105 may be unable to request information and/or actions that have not been authorized by network 103 and/or PMS 101.

Returning to FIG. 1, application provider system 105 may provide (at 106) a network-based application and/or service to UE 107 via network 103. For example, application provider system 105 may send and/or receive traffic to and/or from UE 107, which may include content streaming traffic, voice and/or video call traffic, gaming traffic, AR traffic, etc. While application provider system 105 provides (at 106) the application and/or service to UE 107, PMS 101 may continue to monitor (at 102) KPIs associated with network 103. At some point, PMS 101 may determine (at 108) that one or more monitoring policies 201, associated with application provider system 105, have been satisfied. PMS 101 may accordingly perform one or more actions, such as automatically providing (at 110) an alert to application provider system 105, which may include a portion of the monitored (at 102) KPIs of network 103. The alert may be "automatic" or "asynchronous" in the sense that the alert may be provided based on determining (at 108) that the one or more monitoring policies 201 have been satisfied, rather than being provided based on a specific request. Such portion may include, for example, a set of KPIs or other information specified by monitoring policy 201 which has been met. As discussed above, PMS 101 may verify that application provider system 105 is authorized to receive such information prior to providing (at 110) the information to application provider system 105.

Application provider system 105 may perform (at 112) one or more actions based on the received KPIs. For example, as discussed above, application provider system 105 may modify one or more parameters of the application and/or service provided by application provider system 105, in a manner that accounts for, remediates, mitigates, etc. the network condition being reported (at 110). For example, as discussed above, such modifications may include modifying a bitrate of traffic, modifying one or more queues, modifying QoS parameters associated with one or more UEs 107 (e.g., increasing QoS parameters associated with UEs 107 that are experiencing network-based performance degradation such as an outage or congestion in a particular geographical region), and/or other suitable actions. The ability to receive in-depth network-monitored KPIs in real time or near-real time, in accordance with some embodiments, allows for application provider system 105 to accurately and quickly overcome performance-degrading network conditions.

Figure 3:
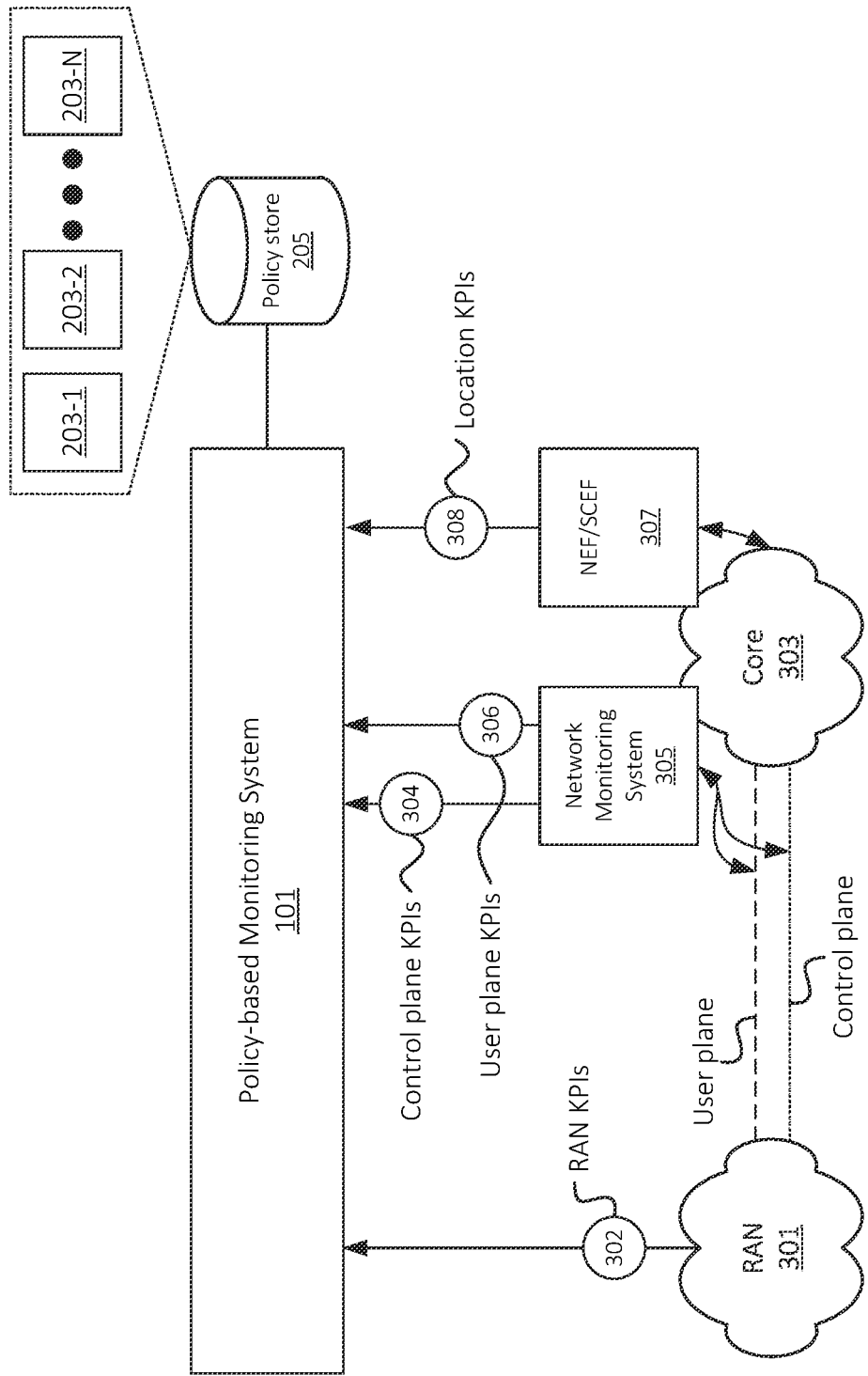
FIG. 3 illustrates different example interfaces between a policy-based monitoring system of some embodiments and elements of a radio access network ("RAN") and/or core network.

As noted above, PMS 101 may communicate with one or more elements, devices, systems, etc. of network 103, in order to monitor (e.g., at 102) network 103 in real time or near-real time. For example, as shown in FIG. 3, PMS 101 may communicate with one or more RANs 301 (e.g., an LTE RAN, a 5G RAN, etc.) and/or core networks 303 (e.g., an Evolved Packet Core ("EPC"), a 5G core ("5GC"), etc.). In some embodiments, PMS 101 may communicate (at 302) with RAN 301 to receive RAN KPIs, such as signal strength KPIs, load-based KPIs (e.g., quantity of connected UEs 107, used and/or available RF capacity, etc.), etc. In some embodiments, PMS 101 may communicate with one or more base stations or other infrastructure devices that implement RAN 301 (e.g., via an X2 interface, an Xn interface, or some other suitable interface).

PMS 101 may additionally communicate (at 304 and/or 306) with Network Monitoring System 305, which may be internal to core network 303 and/or may communicate with one or more elements, devices, systems, Virtualized Network Functions ("VNFs"), etc. of core network 303 via one or more interfaces (e.g., standard and/or proprietary interfaces). For example, network monitoring system 305 may communicate with a Serving Gateway ("SGW"), a Session Management Function ("SMF"), a Mobility Management Entity ("MME"), an Access and Mobility Management Function ("AMF"), a Unified Data Management function ("UDM"), a Home Subscriber Server ("HSS"), a User Plane Function ("UPF"), a Packet Data Network ("PDN") Gateway ("PGW"), and/or other element of core network 303 in order to monitor KPIs of RAN 301 and/or core network 303 and/or provide such KPIs to PMS 101. For example, by communicating with network functions that handle control plane signaling (e.g., an MME, an AMF, an SMF, etc.), network monitoring system 305 may monitor control plane signaling (e.g., call and/or data session establishment, UE handovers, etc.) associated with RAN 301 and/or core network 303. In some embodiments, PMS 101 may receive RAN KPIs from network monitoring system 305 in addition to, or in lieu of, directly receiving such KPIs from RAN 301.

Further, network monitoring system 305 may monitor user plane traffic by communicating with elements of core network 303 that route, process, and/or otherwise handle user plane traffic. For example, network monitoring system 305 may communicate with a UPF, a PGW, an SMF, etc. in order to determine user plane and/or application-level KPIs, such as throughput, latency, jitter, etc. associated with one or more application provider systems 105, applications provided by application provider systems 105, UEs 107, and/or on some other basis. For example, in some embodiments, network monitoring system 305 may perform deep packet inspection ("DPI") or some other suitable technique in order to monitor KPIs or other parameters associated with user plane traffic, which may include a source and/or destination of traffic (e.g., a particular application provider system 105 and/or UE 107), application or application type (e.g., where a particular application provider system 105 may offer multiple applications or application types), QoS identifier, etc. In this manner, PMS 101 may be able to identify such KPIs associated with particular application provider systems 105, applications provided by application provider systems 105, etc. As such, a particular application provider system 105 may be able to receive detailed KPI information that is specific to the particular application provider system 105, without receiving KPI information associated with other application provider systems 105 (and/or other KPI information for which the particular application provider system 105 is not authorized to receive).

Network monitoring system 305 may communicate with, monitor, etc. an SGW via a S1-U interface, with an MME via an S1-C interface, with a PGW via an SGi interface, an AMF via an N14 interface, a UPF via an N9 interface, etc. Additionally, or alternatively, PMS 101 may communicate with, monitor, etc. such network devices directly (e.g., in lieu of, or in addition to, network monitoring system 305). As such, network monitoring system 305 may communicate with elements of RAN 301 and/or core network 303 using standards-based interfaces (e.g., interfaces specified by Third Generation Partnership ("3GPP") standards), proprietary interfaces (e.g., non-standard interfaces), and/or other suitable communication pathways.

PMS 101 may also communicate (at 308) with an information exposure function associated with core network 303, such as a Network Exposure Function ("NEF") or a Service Capability Exposure Function ("SCEF") (e.g., NEF/SCEF 307), in order to monitor KPIs, parameters, etc. associated with core network 303 and/or UEs 107 or application provider systems 105 communicating via core network 303. For example, PMS 101 may receive location information and/or other types of information associated with UEs 107 via NEF/SCEF 307.

Figure 4:
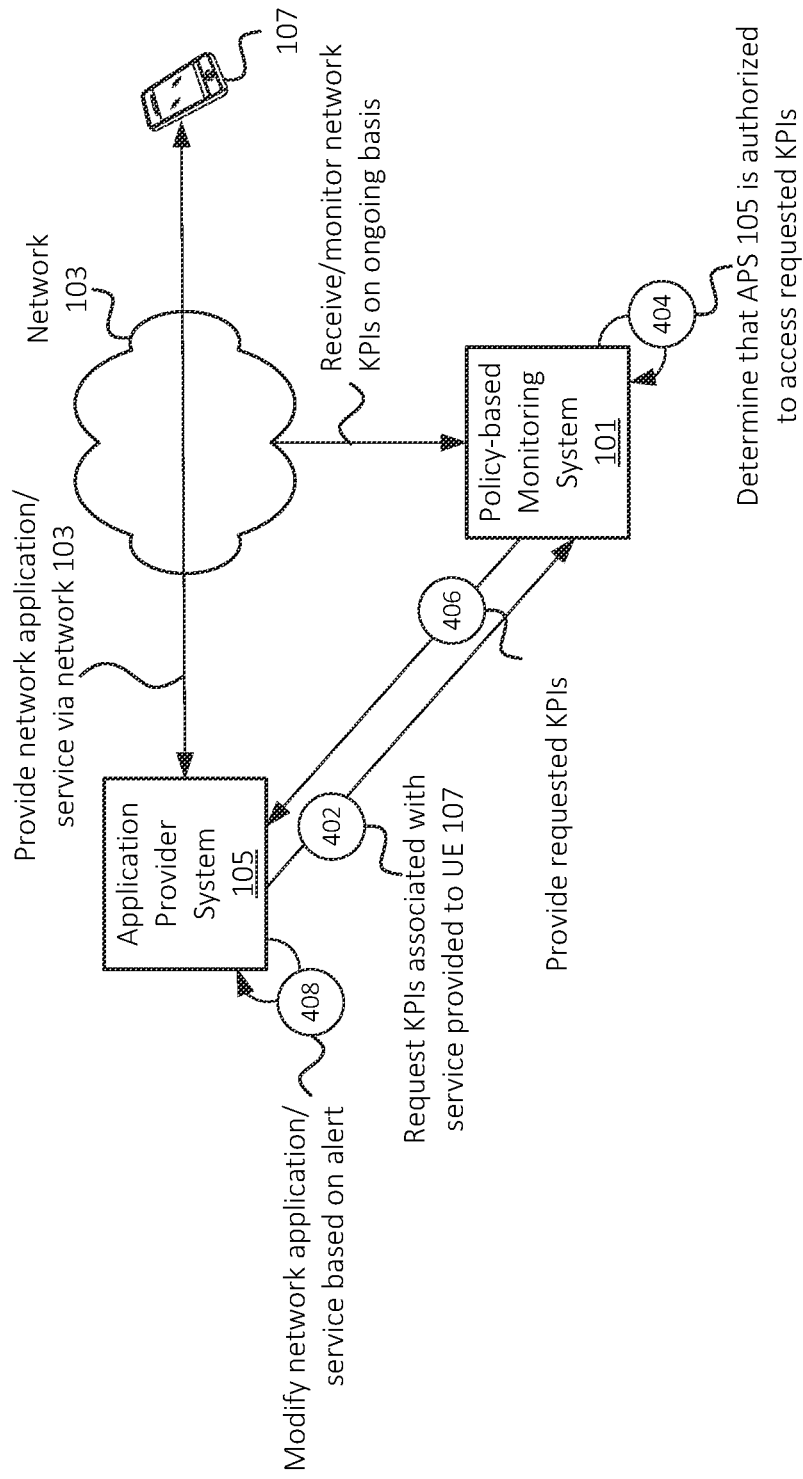
FIGS. 4 and 5 illustrate examples of providing and/or denying access to network information based on authorization information associated with an application provider system, in accordance with some embodiments.

In some embodiments, application provider system 105 may request KPI information from PMS 101. In this manner, application provider system 105 may be able to dynamically request such information, without the need to specify policies 201 ahead of time, and/or in situations where existing policies 201 do not satisfy the immediate considerations of application provider system 105. For example, application provider system 105 may monitor user experience metrics or other metrics, and determine that network 103 may potentially be causing issues with services provided by application provider system 105. As shown in FIG. 4, for example, application provider system 105 may request (at 402) KPI information associated with UE 107 and/or one or more other UEs. As similarly discussed above, application provider system 105 may specify one or more labels, categories, KPIs, etc. For example, application provider system 105 may provide an identifier of UE 107, an identifier of a service provided by application provider system 105 (e.g., which may be included in header and/or payload information of traffic sent and/or received by application provider system 105), and/or other criteria, conditions, etc. As also noted above, such information may be provided in accordance with one or more APIs implemented or associated with PMS 101. PMS 101 may determine (at 404) that application provider system 105 is authorized to request the KPIs. For example, PMS 101 may determine that network 103 has provided an indication that application provider system 105 is authorized to receive such information, may authenticate application provider system 105, etc. PMS 101 may accordingly provide (at 406) the requested KPIs, based on which application provider system 105 may perform (at 408) one or more actions, such as modifying one or more applications and/or services provided to UE 107 and/or one or more other UEs via network 103.

Figure 5:
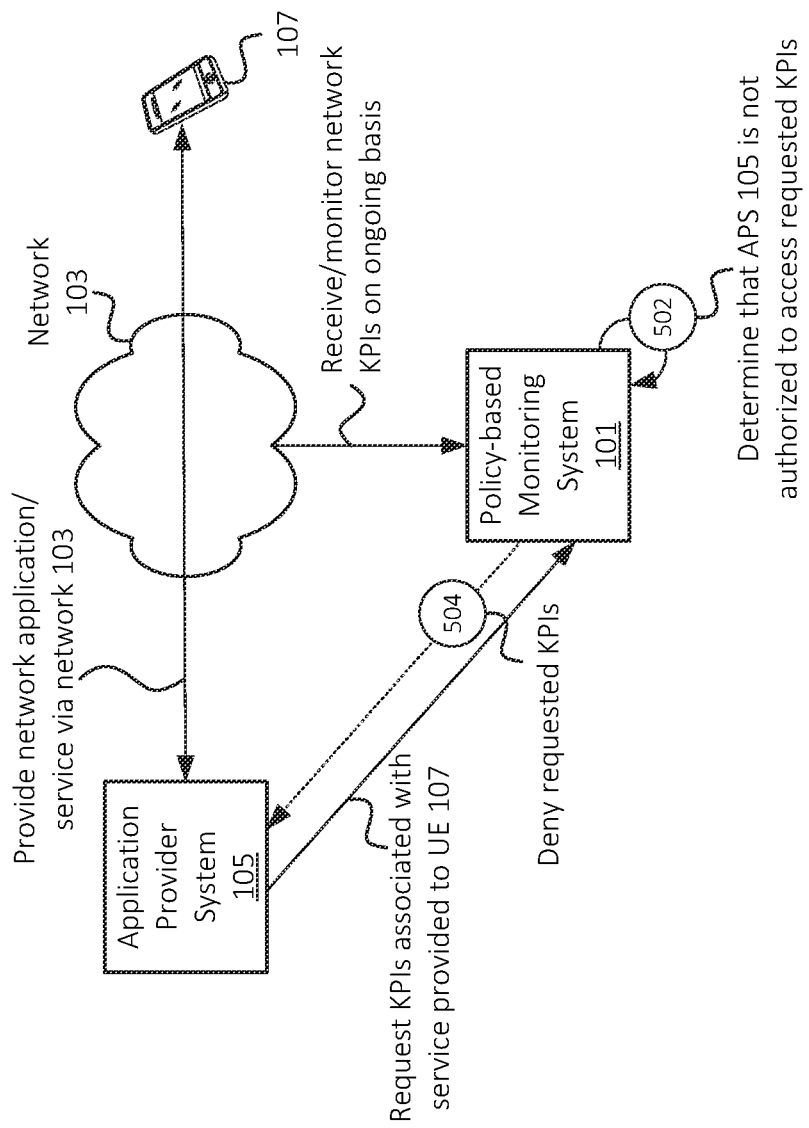

On the other hand, as shown in FIG. 5, if PMS 101 determines (at 502) that application provider system 105 is not authorized to receive the requested KPIs, PMS 101 may deny (at 504) the requested KPIs. For example, PMS 101 may reject the request, forgo sending the requested KPIs, etc. Additionally, or alternatively, PMS 101 may determine that application provider system 105 is authorized to access some, but not all of the requested KPIs. In such instances, PMS 101 may provide a subset of the requested KPIs. Namely, for example, PMS 101 may provide some or all of the requested KPIs that application provider system 105 is authorized to access, while forgoing sending the requested KPIs that application provider system 105 is not authorized to access.

Figure 6:
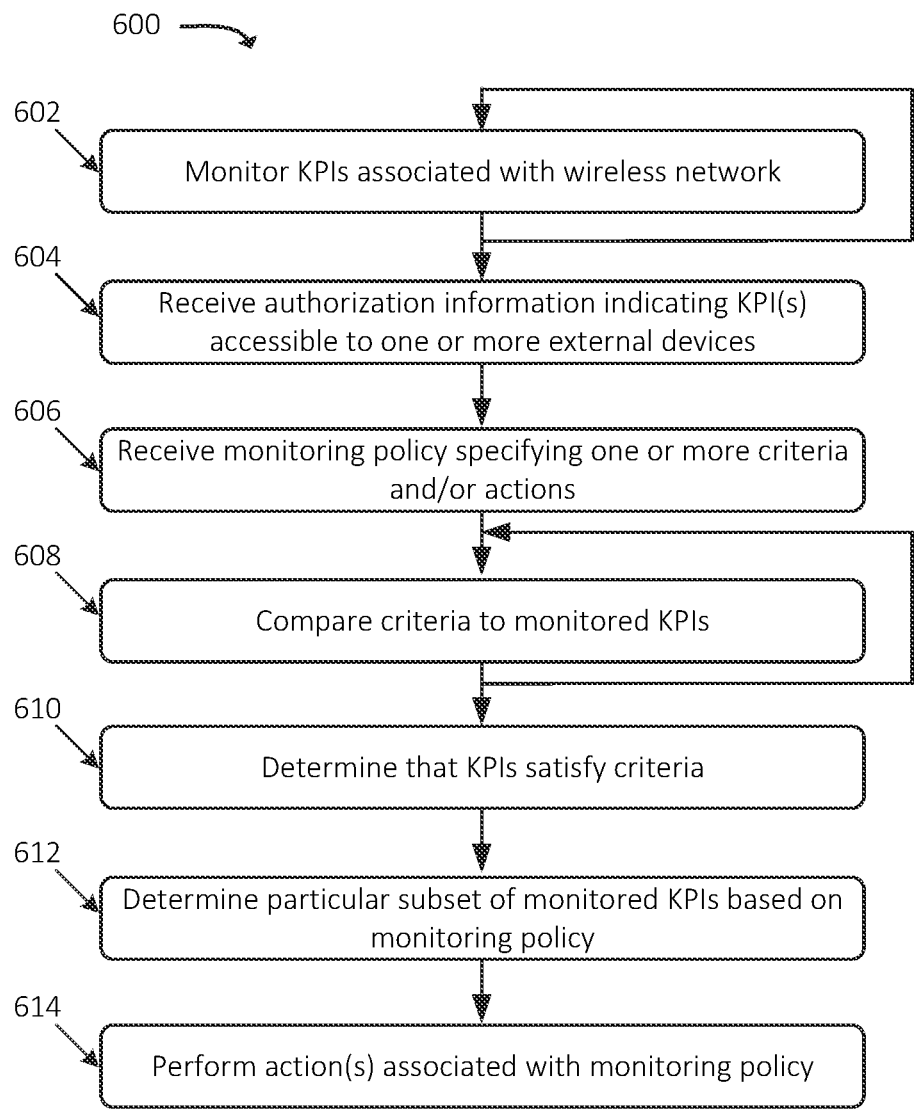
FIG. 6 illustrates an example process for providing KPI monitoring in a wireless network based on one or more monitoring policies, in some embodiments, in accordance with some embodiments.

FIG. 6 illustrates an example process 600 for providing KPI monitoring in a wireless network based on one or more monitoring policies, in some embodiments. In some embodiments, some or all of process 600 may be performed by PMS 101. In some embodiments, one or more other devices may perform some or all of process 600 in concert with, and/or in lieu of, PMS 101, such as network monitoring system 305, NEF/SCEF 307, and/or one or more other devices or systems.

As shown, process 600 may include monitoring (at 602) a set of KPIs associated with a wireless network. For example, as discussed above (e.g., with respect to FIG. 3), PMS 101 may monitor, on an ongoing basis, KPIs associated with a particular network 103 (e.g., RAN 301, core network 303, and/or other portions of network 103 and/or types of networks). In some embodiments, PMS 101 may be associated with one or more secure and/or internal interfaces with respect to RAN 301 and/or core network 303. Additionally, or alternatively, PMS 101 may communicate with one or more elements or components of network 103 that monitor KPIs associated with network 103, such as network monitoring system 305. Such components may, for example, be internal to network 303 and/or may not provide for access or exposure to external devices or systems, such as application provider system 105. PMS 101 may also receive KPI information from other sources, such as NEF/SCEF 307, one or more base stations or other components that are included in or are communicatively coupled to RAN 301, etc. In this manner, PMS 101 may receive and aggregate KPIs associated with network 103 from multiple sources, and may provide a more clear indication of overall KPIs associated with network 103 than would be provided from each individual source.

Process 600 may further include receiving (at 604) authorization information indicating KPIs and/or other types of information that one or more external devices are authorized to access. For example, one or more application provider systems 105 or other devices or systems may be registered with PMS 101, and/or PMS 101 may receive such authorization information in some other manner. The authorization information may include one or more identifiers of application provider systems 105, such that PMS 101 is able to later authenticate such application provider systems 105 and/or determine an authorization level associated with such application provider systems 105 (e.g., when receiving monitoring policies from such application provider systems 105). In some embodiments, the authorization information may specify particular types of actions that are able to be requested by particular application provider systems 105, and/or conditions under which such actions are authorized to be performed. For example, the authorization information for a particular application provider system 105 may indicate that the particular application provider system 105 is authorized to request a particular network modification (e.g., modifying beamforming parameters of RAN 301, modifying QoS treatment of traffic sent by application provider system 105 to one or more UEs 107, modifying routing parameters of traffic sent and/or received by application provider system 105, etc.) under one set of conditions (e.g., if application-level latency is above a particular threshold, if a particular RAN 301 is congested above a threshold measure of congestion, etc.), while the particular application provider system 105 may not be authorized to request the same network modification under a different set of conditions (e.g., if application-level latency is below the particular threshold, if the particular RAN 301 is not congested, etc.).

Process 600 may additionally include receiving (at 606) one or more monitoring policies specifying one or more criteria and/or actions. For example, as discussed above, PMS 101 may receive (e.g., from application provider system 105 and/or some other device or system) a request to perform one or more actions, such as outputting alerts, modifying network configuration parameters, etc. when particular KPIs satisfy one or more criteria. Such criteria may include, for example, thresholds for one or more KPIs, network configuration parameters (e.g., routing parameters, beamforming parameters, etc.), UE identifiers (e.g., identifiers of UEs 107 for which the monitoring is to be performed), application identifiers (e.g., types of applications or services for which the monitoring is to be performed), location-based criteria (e.g., locations of UEs 107 receiving services from application provider system 105, locations of one or more RANs 301 to which such UEs 107 are connected, etc.). In some embodiments, PMS 101 may implement or provide an API specifying types of KPIs, parameters, etc. that are exposed by PMS 101, based on which PMS 101 may provide the one or more monitoring policies. PMS 101 may maintain the received monitoring policy in policy store 205 and/or some other suitable storage. In this manner, PMS 101 may maintain multiple distinct monitoring policy sets 203 associated with multiple application provider systems 105, which may all be authorized to access different types or amounts of KPI information. Thus, while PMS 101 may maintain a holistic set of KPIs associated with network 103, PMS 101 may only expose particular portions of such KPIs to application provider systems 105 for which such application provider systems 105 are authorized to access such portions.

Process 600 may also include comparing (at 608) the criteria, associated with the one or more received monitoring policies, to the monitored KPIs. For example, PMS 101 may, on an ongoing basis, compare the KPIs (monitored at 602) to the monitoring policies, in order to determine whether criteria associated with one or more such monitoring policies have been satisfied, met, etc. For example, PMS 101 may determine whether one or more KPI thresholds or other conditions specified in the monitoring policies have been satisfied, exceeded, etc.

Process 600 may further include determining (at 610) that a particular set of criteria, associated with a particular monitoring policy, as been satisfied. For example, at some point based on the monitoring (at 602) and comparing (at 608), as performed on an ongoing basis, PMS 101 may determine that the particular set of criteria has been satisfied.

Process 600 may additionally include determining (at 612) a particular subset of the monitored KPIs, based on the monitoring policy. For example, PMS 101 may identify a particular set of KPIs that application provider system 105, with which the monitoring policy is associated, is authorized to access. For example, application provider system 105 may be authorized to access some, but not all, of the KPIs monitored (at 602). For instance, particular KPIs (e.g., application-level latency, throughput, etc.) may be accessible to application provider system 105, while other KPIs (e.g., RAN congestion information, network routing information, etc.) may be inaccessible to application provider system 105. In some embodiments, the authorization information (e.g., as received at 604) may specify amounts or levels of granularity with which application provider system 105 is authorized to access KPI information.

As an example, the authorization information may indicate that application provider system 105 is authorized to access KPI information within a 5-minute window prior to and after particular criteria have been satisfied. In such an example, assume that the criteria indicate a maximum application-level latency of traffic output by application provider system 105 to one or more UEs 107. If PMS 101 determines that the latency has been exceeded at a particular time t, application provider system 105 may be authorized to receive KPIs associated with a time range of {t−5 minutes} to {t+5 minutes}.

Process 600 may also include performing (at 614) one or more actions associated with the monitoring policy. For example, PMS 101 may output one or more alerts to application provider system 105, output one or more instructions or indications to one or more elements (e.g., a Software-Defined Network ("SDN") controller, a provisioning system, an orchestration system, etc.) of network 103 to modify one or more network configuration parameters, etc. associated with the monitoring policy.

Figure 7:
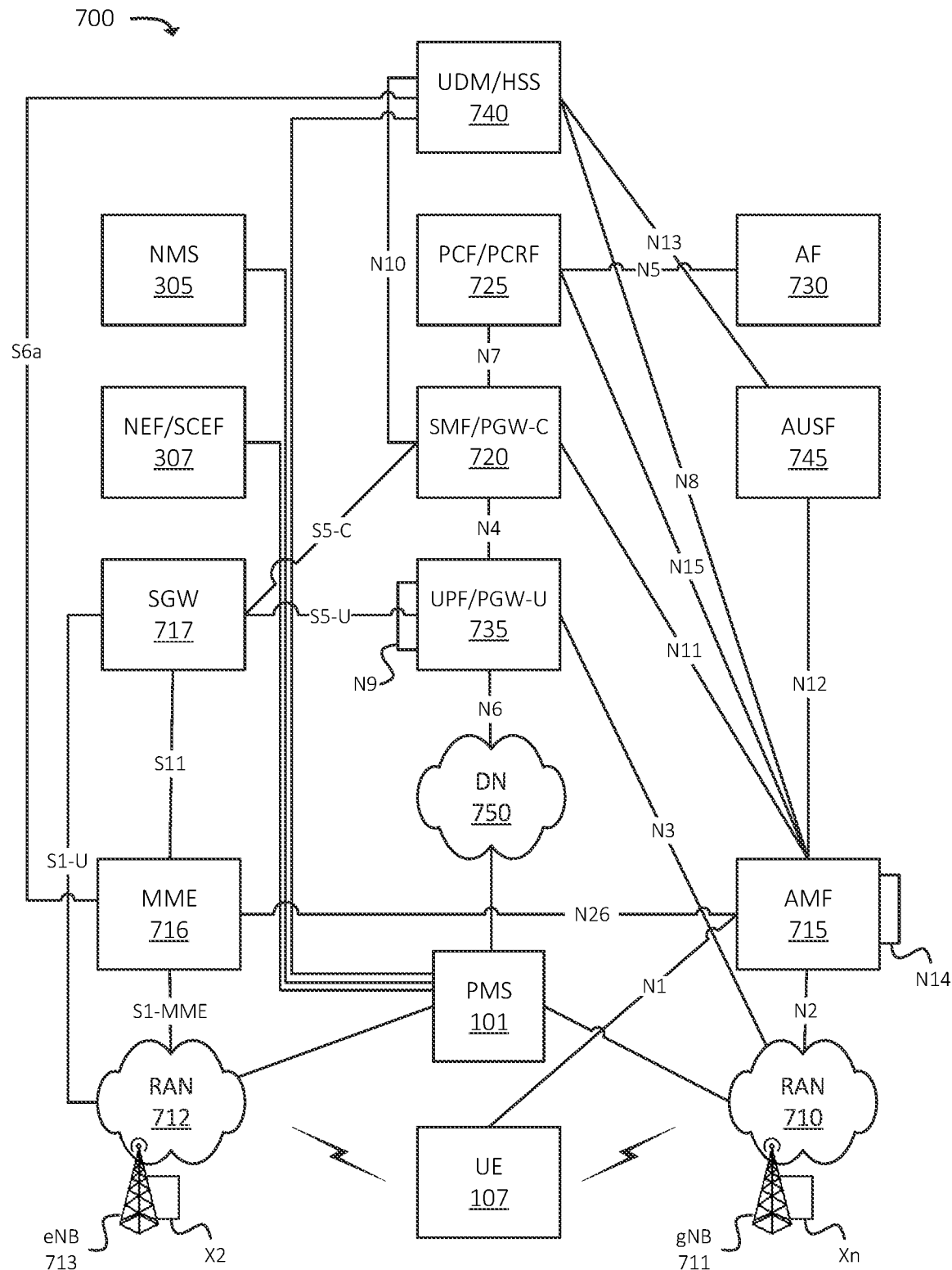
FIG. 7 illustrates an example environment in which one or more embodiments, described herein, may be implemented.

FIG. 7 illustrates an example environment 700, in which one or more embodiments may be implemented. In some embodiments, environment 700 may correspond to a Fifth Generation ("5G") network, and/or may include elements of a 5G network. In some embodiments, environment 700 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). In some embodiments, portions of environment 700 may represent or may include a 5G core ("5GC"). As shown, environment 700 may include UE 701, RAN 710 (which may include one or more Next Generation Node Bs ("gNBs") 711), RAN 712 (which may include one or more evolved Node Bs ("eNBs") 713), and various network functions such as AMF 715, MME 716, SGW 717, SMF/PGW-Control plane function ("PGW-C") 720, Policy Control Function ("PCF")/Policy Charging and Rules Function ("PCRF") 725, Application Function ("AF") 730, UPF/PGW-User plane function ("PGW-U") 735, UDM/HSS 740, and Authentication Server Function ("AUSF") 745. Environment 700 may also include one or more networks, such as Data Network ("DN") 750. Environment 700 may include one or more additional devices or systems communicatively coupled to one or more networks (e.g., DN 750), such as PMS 101, network monitoring system 305, and NEF/SCEF 307.

The example shown in FIG. 7 illustrates one instance of each network component or function (e.g., one instance of SMF/PGW-C 720, PCF/PCRF 725, UPF/PGW-U 735, UDM/HSS 740, and/or AUSF 745). In practice, environment 700 may include multiple instances of such components or functions. For example, in some embodiments, environment 700 may include multiple "slices" of a core network, where each slice includes a discrete and/or logical set of network functions (e.g., one slice may include a first instance of SMF/PGW-C 720, PCF/PCRF 725, UPF/PGW-U 735, UDM/HSS 740, and/or AUSF 745, while another slice may include a second instance of SMF/PGW-C 720, PCF/PCRF 725, UPF/PGW-U 735, UDM/HSS 740, and/or AUSF 745). The different slices may provide differentiated levels of service, such as service in accordance with different Quality of Service ("QoS") parameters.

The quantity of devices and/or networks, illustrated in FIG. 7, is provided for explanatory purposes only. In practice, environment 700 may include additional devices and/or networks, fewer devices and/or networks, different devices and/or networks, or differently arranged devices and/or networks than illustrated in FIG. 7. For example, while not shown, environment 700 may include devices that facilitate or enable communication between various components shown in environment 700, such as routers, modems, gateways, switches, hubs, etc. Alternatively, or additionally, one or more of the devices of environment 700 may perform one or more network functions described as being performed by another one or more of the devices of environment 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

UE 701 may include a computation and communication device, such as a wireless mobile communication device that is capable of communicating with RAN 710, RAN 712, and/or DN 750. UE 701 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an Internet of Things ("IoT") device (e.g., a sensor, a smart home appliance, a wearable device, a Machine-to-Machine ("M2M") device, or the like), or another type of mobile computation and communication device. UE 701 may send traffic to and/or receive traffic (e.g., user plane traffic) from DN 750 via RAN 710, RAN 712, and/or UPF/PGW-U 735.

RAN 710 may be, or may include, a 5G RAN that includes one or more base stations (e.g., one or more gNBs 711), via which UE 701 may communicate with one or more other elements of environment 700. UE 701 may communicate with RAN 710 via an air interface (e.g., as provided by gNB 711). For instance, RAN 710 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 710 may receive traffic intended for UE 701 (e.g., from UPF/PGW-U 735, AMF 715, and/or one or more other devices or networks) and may communicate the traffic to UE 701 via the air interface. In some embodiments, RAN 301 may be, may include, and/or may be implemented by one or more RANs 710.

RAN 712 may be, or may include, a LTE RAN that includes one or more base stations (e.g., one or more eNBs 713), via which UE 701 may communicate with one or more other elements of environment 700. UE 701 may communicate with RAN 712 via an air interface (e.g., as provided by eNB 713). For instance, RAN 712 may receive traffic (e.g., voice call traffic, data traffic, messaging traffic, signaling traffic, etc.) from UE 701 via the air interface, and may communicate the traffic to UPF/PGW-U 735, and/or one or more other devices or networks. Similarly, RAN 712 may receive traffic intended for UE 701 (e.g., from UPF/PGW-U 735, SGW 717, and/or one or more other devices or networks) and may communicate the traffic to UE 701 via the air interface. In some embodiments, RAN 301 may be, may include, and/or may be implemented by one or more RANs 712.

AMF 715 may include one or more devices, systems, Virtualized Network Functions ("VNFs"), Cloud-Native Network Functions ("CNFs"), etc., that perform operations to register UE 701 with the 5G network, to establish bearer channels associated with a session with UE 701, to hand off UE 701 from the 5G network to another network, to hand off UE 701 from the other network to the 5G network, manage mobility of UE 701 between RANs 710 and/or gNBs 711, and/or to perform other operations. In some embodiments, the 5G network may include multiple AMFs 715, which communicate with each other via the N14 interface (denoted in FIG. 7 by the line marked "N14" originating and terminating at AMF 715).

MME 716 may include one or more devices, systems, VNFs, CNFs, etc., that perform operations to register UE 701 with the EPC, to establish bearer channels associated with a session with UE 701, to hand off UE 701 from the EPC to another network, to hand off UE 701 from another network to the EPC, manage mobility of UE 701 between RANs 712 and/or eNBs 713, and/or to perform other operations.

SGW 717 may include one or more devices, systems, VNFs, CNFs, etc., that aggregate traffic received from one or more eNBs 713 and send the aggregated traffic to an external network or device via UPF/PGW-U 735. Additionally, SGW 717 may aggregate traffic received from one or more UPF/PGW-Us 735 and may send the aggregated traffic to one or more eNBs 713. SGW 717 may operate as an anchor for the user plane during inter-eNB handovers and as an anchor for mobility between different telecommunication networks or RANs (e.g., RANs 710 and 712).

SMF/PGW-C 720 may include one or more devices, systems, VNFs, CNFs, etc., that gather, process, store, and/or provide information in a manner described herein. SMF/PGW-C 720 may, for example, facilitate the establishment of communication sessions on behalf of UE 701. In some embodiments, the establishment of communications sessions may be performed in accordance with one or more policies provided by PCF/PCRF 725.

PCF/PCRF 725 may include one or more devices, systems, VNFs, CNFs, etc., that aggregate information to and from the 5G network and/or other sources. PCF/PCRF 725 may receive information regarding policies and/or subscriptions from one or more sources, such as subscriber databases and/or from one or more users (such as, for example, an administrator associated with PCF/PCRF 725).

AF 730 may include one or more devices, systems, VNFs, CNFs, etc., that receive, store, and/or provide information that may be used in determining parameters (e.g., quality of service parameters, charging parameters, or the like) for certain applications.

UPF/PGW-U 735 may include one or more devices, systems, VNFs, CNFs, etc., that receive, store, and/or provide data (e.g., user plane data). For example, UPF/PGW-U 735 may receive user plane data (e.g., voice call traffic, data traffic, etc.), destined for UE 701, from DN 750, and may forward the user plane data toward UE 701 (e.g., via RAN 710, SMF/PGW-C 720, and/or one or more other devices). In some embodiments, multiple UPFs 735 may be deployed (e.g., in different geographical locations), and the delivery of content to UE 701 may be coordinated via the N9 interface (e.g., as denoted in FIG. 7 by the line marked "N9" originating and terminating at UPF/PGW-U 735). Similarly, UPF/PGW-U 735 may receive traffic from UE 701 (e.g., via RAN 710, SMF/PGW-C 720, and/or one or more other devices), and may forward the traffic toward DN 750. In some embodiments, UPF/PGW-U 735 may communicate (e.g., via the N4 interface) with SMF/PGW-C 720, regarding user plane data processed by UPF/PGW-U 735.

UDM/HSS 740 and AUSF 745 may include one or more devices, systems, VNFs, CNFs, etc., that manage, update, and/or store, in one or more memory devices associated with AUSF 745 and/or UDM/HSS 740, profile information associated with a subscriber. AUSF 745 and/or UDM/HSS 740 may perform authentication, authorization, and/or accounting operations associated with the subscriber and/or a communication session with UE 701.

DN 750 may include one or more wired and/or wireless networks. For example, DN 750 may include an Internet Protocol ("IP")-based PDN, a wide area network ("WAN") such as the Internet, a private enterprise network, and/or one or more other networks. UE 701 may communicate, through DN 750, with data servers, other UEs 701, and/or to other servers or applications that are coupled to DN 750. DN 750 may be connected to one or more other networks, such as a public switched telephone network ("PSTN"), a public land mobile network ("PLMN"), and/or another network. DN 750 may be connected to one or more devices, such as content providers, applications, web servers, and/or other devices, with which UE 701 may communicate.

Figure 8:
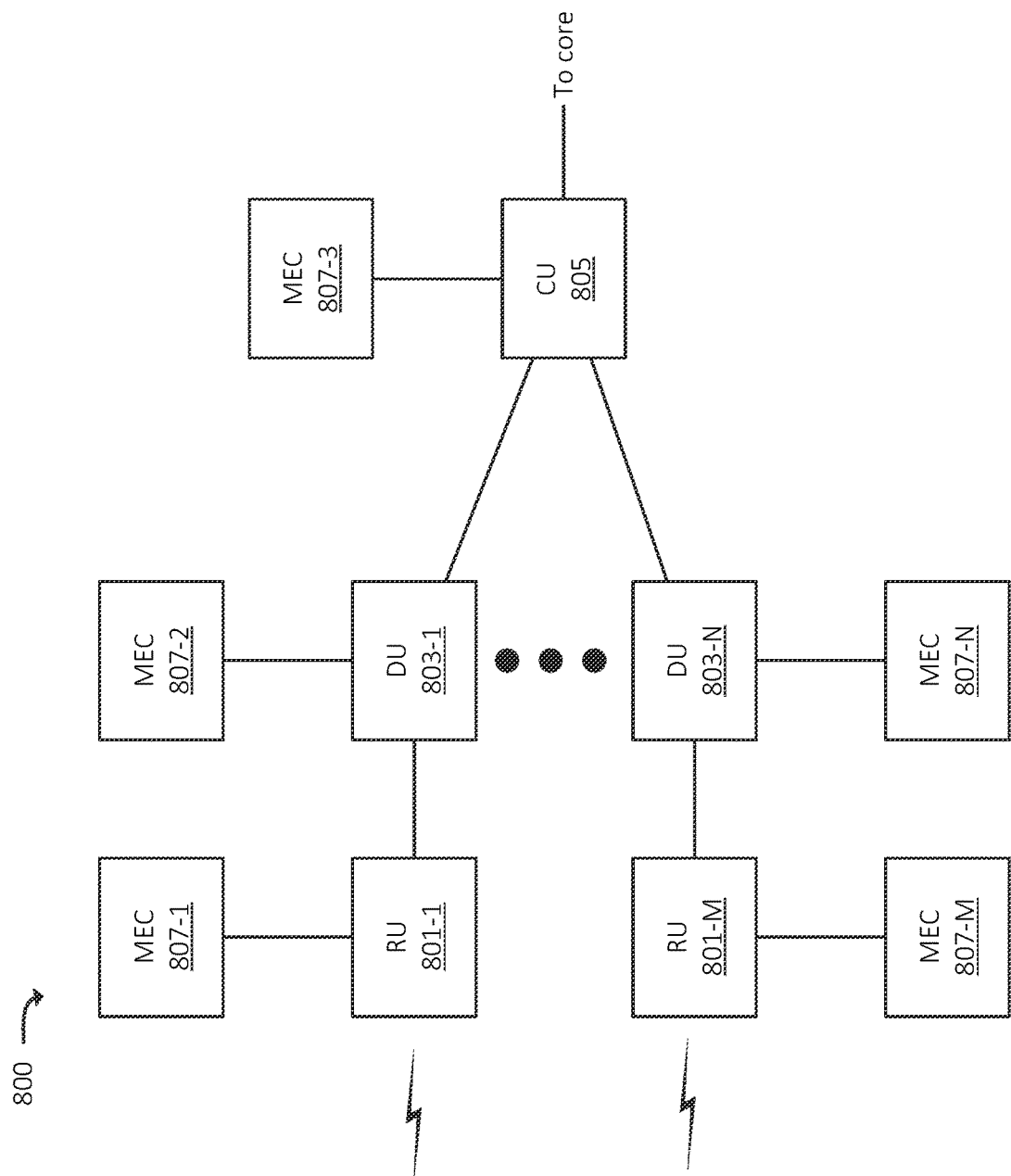
FIG. 8 illustrates an example arrangement of a RAN, in accordance with some embodiments.

FIG. 8 illustrates an example Distributed Unit ("DU") network 800, which may be included in and/or implemented by one or more RANs (e.g., RAN 710, RAN 712, or some other RAN). In some embodiments, a particular RAN may include one DU network 800. In some embodiments, a particular RAN may include multiple DU networks 800. In some embodiments, DU network 800 may correspond to a particular gNB 711 of a 5G RAN (e.g., RAN 710). In some embodiments, DU network 800 may correspond to multiple gNBs 711. In some embodiments, DU network 800 may correspond to one or more other types of base stations of one or more other types of RANs. As shown, DU network 800 may include Central Unit ("CU") 805, one or more Distributed Units ("DUs") 803-1 through 803-N (referred to individually as "DU 803," or collectively as "DUs 803"), and one or more Radio Units ("RUs") 801-1 through 801-M (referred to individually as "RU 801," or collectively as "RUs 801").

CU 805 may communicate with a core of a wireless network (e.g., may communicate with one or more of the devices or systems described above with respect to FIG. 7, such as AMF 715 and/or UPF/PGW-U 735). In the uplink direction (e.g., for traffic from UEs 701 to a core network), CU 805 may aggregate traffic from DUs 803, and forward the aggregated traffic to the core network. In some embodiments, CU 805 may receive traffic according to a given protocol (e.g., Radio Link Control ("RLC")) from DUs 803, and may perform higher-layer processing (e.g., may aggregate/process RLC packets and generate Packet Data Convergence Protocol ("PDCP") packets based on the RLC packets) on the traffic received from DUs 803.

In accordance with some embodiments, CU 805 may receive downlink traffic (e.g., traffic from the core network) for a particular UE 701, and may determine which DU(s) 803 should receive the downlink traffic. DU 803 may include one or more devices that transmit traffic between a core network (e.g., via CU 805) and UE 701 (e.g., via a respective RU 801). DU 803 may, for example, receive traffic from RU 801 at a first layer (e.g., physical ("PHY") layer traffic, or lower PHY layer traffic), and may process/aggregate the traffic to a second layer (e.g., upper PHY and/or RLC). DU 803 may receive traffic from CU 805 at the second layer, may process the traffic to the first layer, and provide the processed traffic to a respective RU 801 for transmission to UE 701.

RU 801 may include hardware circuitry (e.g., one or more RF transceivers, antennas, radios, and/or other suitable hardware) to communicate wirelessly (e.g., via an RF interface) with one or more UEs 701, one or more other DUs 803 (e.g., via RUs 801 associated with DUs 803), and/or any other suitable type of device. In the uplink direction, RU 801 may receive traffic from UE 701 and/or another DU 803 via the RF interface and may provide the traffic to DU 803. In the downlink direction, RU 801 may receive traffic from DU 803, and may provide the traffic to UE 701 and/or another DU 803.

RUs 801 may, in some embodiments, be communicatively coupled to one or more Multi-Access/Mobile Edge Computing ("MEC") devices, referred to sometimes herein simply as "MECs" 807. For example, RU 801-1 may be communicatively coupled to MEC 807-1, RU 801-M may be communicatively coupled to MEC 807-M, DU 803-1 may be communicatively coupled to MEC 807-2, DU 803-N may be communicatively coupled to MEC 807-N, CU 805 may be communicatively coupled to MEC 807-3, and so on. MECs 807 may include hardware resources (e.g., configurable or provisionable hardware resources) that may be configured to provide services and/or otherwise process traffic to and/or from UE 701, via a respective RU 801.

For example, RU 801-1 may route some traffic, from UE 701, to MEC 807-1 instead of to a core network (e.g., via DU 803 and CU 805). MEC 807-1 may process the traffic, perform one or more computations based on the received traffic, and may provide traffic to UE 701 via RU 801-1. In this manner, ultra-low latency services may be provided to UE 701, as traffic does not need to traverse DU 803, CU 805, and an intervening backhaul network between DU network 800 and the core network. In some embodiments, MEC 807 may include, and/or may implement, some or all of the functionality described above with respect to PMS 101, network monitoring system 305, UPF 735, and/or one or more other devices, systems, VNFs, CNFs, etc.

Figure 9:
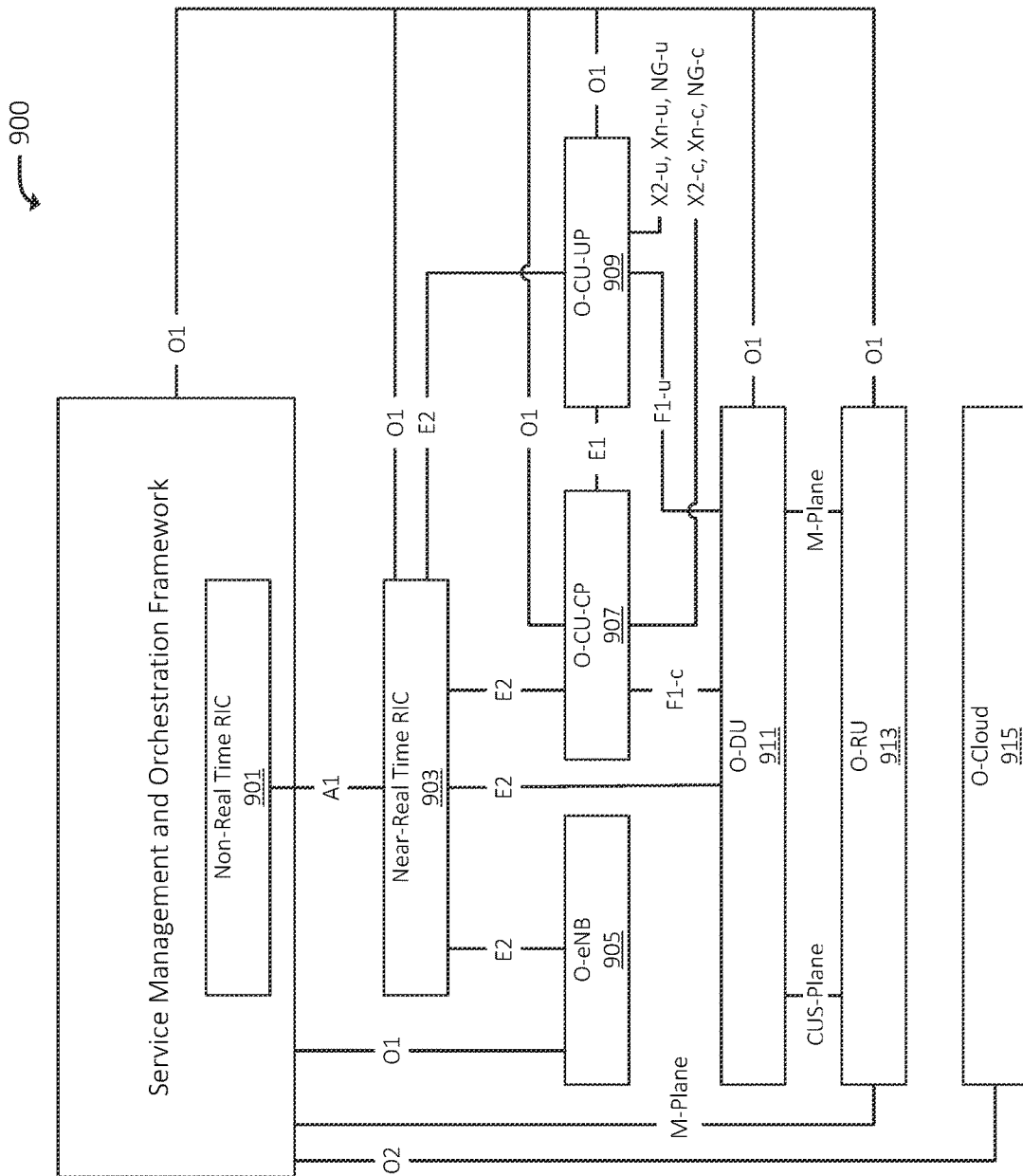
FIG. 9 illustrates an example arrangement of an Open RAN ("O-RAN") environment in which one or more embodiments, described herein, may be implemented.

FIG. 9 illustrates an example O-RAN environment 900, which may correspond to RAN 710, RAN 712, and/or DU network 800. For example, RAN 710, RAN 712, and/or DU network 800 may include one or more instances of O-RAN environment 900, and/or one or more instances of O-RAN environment 900 may implement RAN 710, RAN 712, DU network 800, and/or some portion thereof. As shown, O-RAN environment 900 may include Non-Real Time Radio Intelligent Controller ("RIC") 901, Near-Real Time MC 903, O-eNB 905, O-CU-Control Plane ("O-CU-CP") 907, O-CU-User Plane ("O-CU-UP") 909, O-DU 911, O-RU 913, and O-Cloud 915. In some embodiments, O-RAN environment 900 may include additional, fewer, different, and/or differently arranged components.

In some embodiments, some or all of the elements of O-RAN environment 900 may be implemented by one or more configurable or provisionable resources, such as virtual machines, cloud computing systems, physical servers, and/or other types of configurable or provisionable resources. In some embodiments, some or all of O-RAN environment 900 may be implemented by, and/or communicatively coupled to, one or more MECs 807. In some embodiments, PMS 101 may receive KPIs associated with O-RAN environment 900 from one or more elements of O-RAN environment 900, and/or may provide configuration parameter instructions (e.g., based on one or more actions specified in one or more monitoring policies) to O-RAN environment 900.

Non-Real Time RIC 901 and Near-Real Time RIC 903 may receive performance information (and/or other types of information) from one or more sources, and may configure other elements of O-RAN environment 900 based on such performance or other information. For example, Near-Real Time RIC 903 may receive performance information, via one or more E2 interfaces, from O-eNB 905, O-CU-CP 907, and/or O-CU-UP 909, and may modify parameters associated with O-eNB 905, O-CU-CP 907, and/or O-CU-UP 909 based on such performance information. Similarly, Non-Real Time RIC 901 may receive performance information associated with O-eNB 905, O-CU-CP 907, O-CU-UP 909, and/or one or more other elements of O-RAN environment 900 and may utilize machine learning and/or other higher level computing or processing to determine modifications to the configuration of O-eNB 905, O-CU-CP 907, O-CU-UP 909, and/or other elements of O-RAN environment 900. In some embodiments, Non-Real Time RIC 901 may generate machine learning models based on performance information associated with O-RAN environment 900 or other sources, and may provide such models to Near-Real Time MC 903 for implementation.

O-eNB 905 may perform functions similar to those described above with respect to eNB 713. For example, O-eNB 905 may facilitate wireless communications between UE 1 uu and a core network. O-CU-CP 907 may perform control plane signaling to coordinate the aggregation and/or distribution of traffic via one or more DUs 803, which may include and/or be implemented by one or more O-DUs 911, and O-CU-UP 909 may perform the aggregation and/or distribution of traffic via such DUs 803 (e.g., O-DUs 911). O-DU 911 may be communicatively coupled to one or more RUs 801, which may include and/or may be implemented by one or more O-RUs 913. In some embodiments, O-Cloud 915 may include or be implemented by one or more MECs 807, which may provide services, and may be communicatively coupled, to O-CU-CP 907, O-CU-UP 909, O-DU 911, and/or O-RU 913 (e.g., via an O1 and/or O2 interface).

Figure 10:
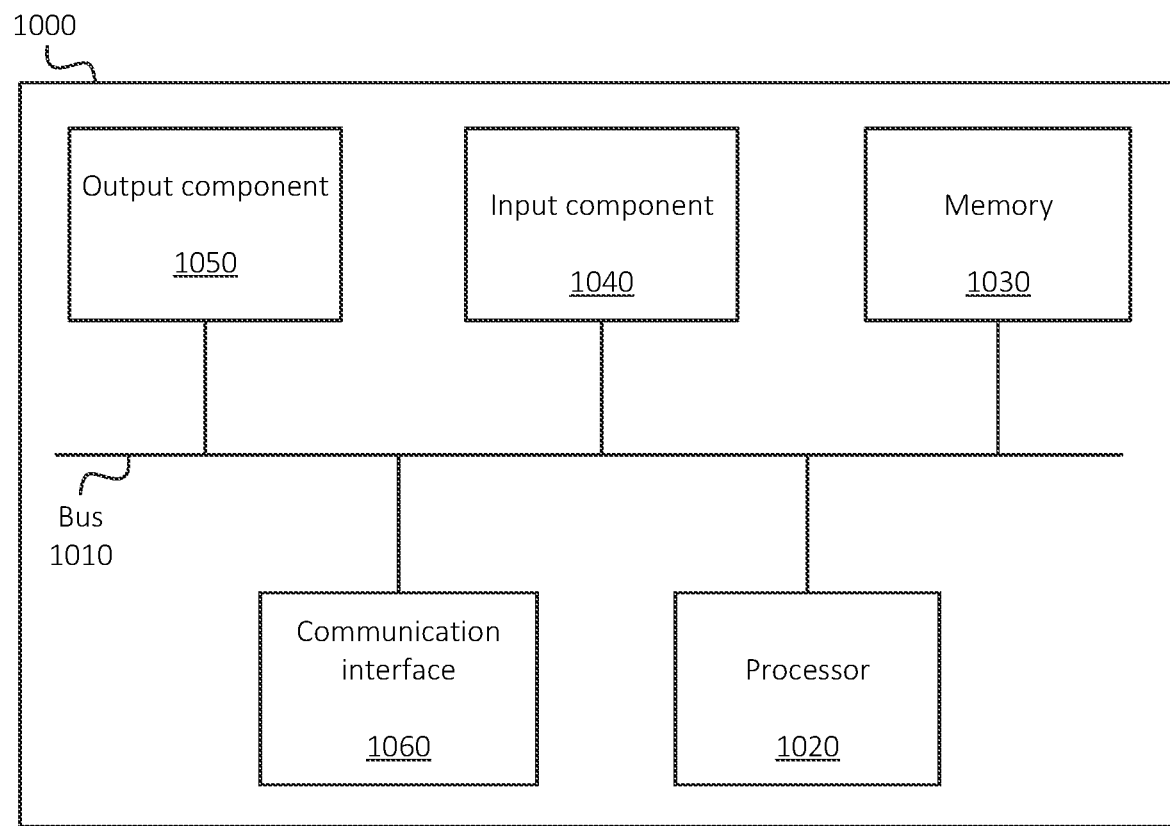
FIG. 10 illustrates example components of one or more devices, in accordance with one or more embodiments described herein.

FIG. 10 illustrates example components of device 1000. One or more of the devices described above may include one or more devices 1000. Device 1000 may include bus 1010, processor 1020, memory 1030, input component 1040, output component 1050, and communication interface 1060. In another implementation, device 1000 may include additional, fewer, different, or differently arranged components.

Bus 1010 may include one or more communication paths that permit communication among the components of device 1000. Processor 1020 may include a processor, microprocessor, or processing logic that may interpret and execute instructions. In some embodiments, processor 1020 may be or may include one or more hardware processors. Memory 1030 may include any type of dynamic storage device that may store information and instructions for execution by processor 1020, and/or any type of non-volatile storage device that may store information for use by processor 1020.

Input component 1040 may include a mechanism that permits an operator to input information to device 1000 and/or other receives or detects input from a source external to 1040, such as a touchpad, a touchscreen, a keyboard, a keypad, a button, a switch, a microphone or other audio input component, etc. In some embodiments, input component 1040 may include, or may be communicatively coupled to, one or more sensors, such as a motion sensor (e.g., which may be or may include a gyroscope, accelerometer, or the like), a location sensor (e.g., a Global Positioning System ("GPS")-based location sensor or some other suitable type of location sensor or location determination component), a thermometer, a barometer, and/or some other type of sensor. Output component 1050 may include a mechanism that outputs information to the operator, such as a display, a speaker, one or more light emitting diodes ("LEDs"), etc.

Communication interface 1060 may include any transceiver-like mechanism that enables device 1000 to communicate with other devices and/or systems. For example, communication interface 1060 may include an Ethernet interface, an optical interface, a coaxial interface, or the like. Communication interface 1060 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1000 may include more than one communication interface 1060. For instance, device 1000 may include an optical interface and an Ethernet interface.

Device 1000 may perform certain operations relating to one or more processes described above. Device 1000 may perform these operations in response to processor 1020 executing software instructions stored in a computer-readable medium, such as memory 1030. A computer-readable medium may be defined as a non-transitory memory device. A memory device may include space within a single physical memory device or spread across multiple physical memory devices. The software instructions may be read into memory 1030 from another computer-readable medium or from another device. The software instructions stored in memory 1030 may cause processor 1020 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, while series of blocks and/or signals have been described above (e.g., with regard to FIGS. 1-6), the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned implementations collect, store, or employ personal information of individuals, groups or other entities, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various access control, encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A first device, comprising:
one or more processors configured to:
monitor a plurality of Key Performance Indicators ("KPIs") associated with a wireless network, wherein monitoring the KPIs includes performing deep packet inspection on user plane traffic associated with the wireless network in order to identify that the particular user plane traffic is associated with a second device;
receive, from the second device, a monitoring policy specifying one or more criteria;
compare the criteria associated with the monitoring policy to the monitored KPIs;
determine, based on the comparing, that the criteria associated with the monitoring policy is satisfied, wherein determining that the criteria associated with the monitoring policy is satisfied includes determining that one or more KPIs associated with the particular user plane traffic associated with the second device satisfy the criteria associated with the monitoring policy;
determine a particular subset of the monitored KPIs based on the monitoring policy and further based on determining that the criteria associated with the monitoring policy is satisfied; and
output the particular subset of the monitored KPIs to the second device, wherein outputting the particular subset of the monitored KPIs allows the second device to monitor KPIs of the wireless network that are specified by the monitoring policy, without exposing other KPIs of the wireless network to the second device.

2. The first device of claim 1, wherein the one or more processors are further configured to:
receive authorization information indicating amounts or types of KPIs that the second device is authorized to access, wherein determining the particular subset of monitored KPIs is further based on the authorization information.

3. The first device of claim 1, wherein the plurality of KPIs include:
a first set of KPIs associated with a radio access network ("RAN") of the wireless network, and
a second set of KPIs associated with a core network of the wireless network.

4. The first device of claim 1,
wherein at least a first portion of the KPIs are received via at least one of:
a Service Capability Exposure Function ("SCEF"), or
a Network Exposure Function ("NEF"), and
wherein at least a second portion of the KPIs are received via one or more elements of the wireless network other than a SCEF or a NEF.

5. The first device of claim 1, wherein outputting the particular subset of the monitored KPIs includes automatically pushing the particular subset of the monitored KPIs to the second device based on determining that the criteria associated with the monitoring policy is satisfied.

6. The first device of claim 1, wherein the criteria associated with the monitoring policy include an identifier of a particular User Equipment ("UE"), wherein determining that the criteria associated with the monitoring policy is satisfied includes determining that at least a portion of the KPIs, associated with the wireless network and also associated with the particular UE, satisfy the criteria.

7. The first device of claim 1, wherein the one or more processors are further configured to:
receive a request, from the second device, for particular KPI information, wherein the requested particular KPI information;
determine, based on the monitoring policy, that the second device is not authorized to receive the requested particular KPI information; and
deny the request for the particular KPI information.

8. A non-transitory computer-readable medium, storing a plurality of processor-executable instructions to:
monitor a plurality of Key Performance Indicators ("KPIs") associated with a wireless network, wherein monitoring the KPIs includes performing deep packet inspection on user plane traffic associated with the wireless network in order to identify that the particular user plane traffic is associated with a particular device;
receive, from the particular device, a monitoring policy specifying one or more criteria;
compare the criteria associated with the monitoring policy to the monitored KPIs;
determine, based on the comparing, that the criteria associated with the monitoring policy is satisfied, wherein determining that the criteria associated with the monitoring policy is satisfied includes determining that one or more KPIs associated with the particular user plane traffic associated with the particular device satisfy the criteria associated with the monitoring policy;
determine a particular subset of the monitored KPIs based on the monitoring policy and further based on determining that the criteria associated with the monitoring policy is satisfied; and
output the particular subset of the monitored KPIs to the particular device, wherein outputting the particular subset of the monitored KPIs allows the particular device to monitor KPIs of the wireless network that are specified by the monitoring policy, without exposing other KPIs of the wireless network to the particular device.

9. The non-transitory computer-readable medium of claim 8, wherein the plurality of processor-executable instructions further include processor-executable instructions to:
receive authorization information indicating amounts or types of KPIs that the particular device is authorized to access, wherein determining the particular subset of monitored KPIs is further based on the authorization information.

10. The non-transitory computer-readable medium of claim 8, wherein the plurality of KPIs include:
a first set of KPIs associated with a radio access network ("RAN") of the wireless network, and
a second set of KPIs associated with a core network of the wireless network.

11. The non-transitory computer-readable medium of claim 8,
wherein at least a first portion of the KPIs are received via at least one of:
a Service Capability Exposure Function ("SCEF"), or
a Network Exposure Function ("NEF"), and
wherein at least a second portion of the KPIs are received via one or more elements of the wireless network other than a SCEF or a NEF.

12. The non-transitory computer-readable medium of claim 8, wherein outputting the particular subset of the monitored KPIs includes automatically pushing the particular subset of the monitored KPIs to the particular device based on determining that the criteria associated with the monitoring policy is satisfied.

13. The non-transitory computer-readable medium of claim 8, wherein the criteria associated with the monitoring policy include an identifier of a particular User Equipment ("UE"), wherein determining that the criteria associated with the monitoring policy is satisfied includes determining that at least a portion of the KPIs, associated with the wireless network and also associated with the particular UE, satisfy the criteria.

14. The non-transitory computer-readable medium of claim 8, wherein the plurality of processor-executable instructions further include processor-executable instructions to:
   receive a request, from the particular device, for particular KPI information, wherein the requested particular KPI information;
   determine, based on the monitoring policy, that the particular device is not authorized to receive the requested particular KPI information; and
   deny the request for the particular KPI information.

15. A method, comprising:
   monitoring a plurality of Key Performance Indicators ("KPIs") associated with a wireless network, wherein monitoring the KPIs includes performing deep packet inspection on user plane traffic associated with the wireless network in order to identify that the particular user plane traffic is associated with a particular device;
   receiving, from the particular device, a monitoring policy specifying one or more criteria;
   comparing the criteria associated with the monitoring policy to the monitored KPIs;
   determining, based on the comparing, that the criteria associated with the monitoring policy is satisfied, wherein determining that the criteria associated with the monitoring policy is satisfied includes determining that one or more KPIs associated with the particular user plane traffic associated with the particular device satisfy the criteria associated with the monitoring policy;
   determining a particular subset of the monitored KPIs based on the monitoring policy and further based on determining that the criteria associated with the monitoring policy is satisfied; and
   outputting the particular subset of the monitored KPIs to the particular second device, wherein outputting the particular subset of the monitored KPIs allows the particular second device to monitor KPIs of the wireless network that are specified by the monitoring policy, without exposing other KPIs of the wireless network to the particular first device.

16. The method of claim 15, further comprising:
   receive authorization information indicating amounts or types of KPIs that the particular device is authorized to access, wherein determining the particular subset of monitored KPIs is further based on the authorization information.

17. The method of claim 15, wherein the plurality of KPIs include:
   a first set of KPIs associated with a radio access network ("RAN") of the wireless network, and
   a second set of KPIs associated with a core network of the wireless network.

18. The method of claim 15,
   wherein at least a first portion of the KPIs are received via at least one of:
      a Service Capability Exposure Function ("SCEF"), or
      a Network Exposure Function ("NEF"), and
   wherein at least a second portion of the KPIs are received via one or more elements of the wireless network other than a SCEF or a NEF.

19. The method of claim 15, wherein outputting the particular subset of the monitored KPIs includes automatically pushing the particular subset of the monitored KPIs to the particular device based on determining that the criteria associated with the monitoring policy is satisfied.

20. The method of claim 15, further including:
   receiving a request, from the particular device, for particular KPI information, wherein the requested particular KPI information;
   determining, based on the monitoring policy, that the particular device is not authorized to receive the requested particular KPI information; and
   denying the request for the particular KPI information.

\* \* \* \* \*